(12) United States Patent
Alcala et al.

(10) Patent No.: US 9,014,047 B2
(45) Date of Patent: Apr. 21, 2015

(54) SYSTEM AND METHOD FOR AGGREGATING AND REPORTING NETWORK TRAFFIC DATA

(75) Inventors: Raoul Alcala, Superior, CO (US); Niclas Comstedt, Broomfield, CO (US); Jeff Whitaker, Broomfield, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 12/116,354

(22) Filed: May 7, 2008

(65) Prior Publication Data

US 2009/0016236 A1    Jan. 15, 2009

Related U.S. Application Data

(60) Provisional application No. 60/948,960, filed on Jul. 10, 2007.

(51) Int. Cl.
*H04L 12/26* (2006.01)
*H04L 1/00* (2006.01)
*H04L 12/851* (2013.01)

(52) U.S. Cl.
CPC ............ *H04L 43/022* (2013.01); *H04L 43/026* (2013.01); *H04L 43/062* (2013.01); *H04L 47/2425* (2013.01); *Y02B 60/33* (2013.01)

(58) Field of Classification Search
CPC ..... H04L 43/022; H04L 43/026; H04L 4/062; H04L 47/24253
USPC ......... 370/230, 232, 252, 253, 235, 231, 392, 370/412, 428, 429, 474, 477, 254, 395.31
See application file for complete search history.

(56) References Cited

U.S. PATENT DOCUMENTS

| 5,233,604 A | 8/1993 | Ahmadi et al. |
| 5,926,101 A | 7/1999 | Dasgupta |

(Continued)

FOREIGN PATENT DOCUMENTS

| CN | 1424756 | 6/2003 |
| EP | 1318629 A2 * | 6/2003 |

(Continued)

OTHER PUBLICATIONS

International Searching Authority, Korean Intellectual Property Office, International Search Report(Form PCT/ISA/220) for International application No. PCT/US2008/068906, International Filing Date: Jul. 1, 2008, 6 pages.

(Continued)

*Primary Examiner* — Samina Choudhry

(57) ABSTRACT

A method for analyzing traffic in a communications network includes sampling data packets at a plurality of network interconnection points, wherein sampling the data packets includes generating a plurality of sampled packet data in one or more standardized formats, converting the sampled packet data from the one or more standardized formats into a neutral format, and aggregating the sampled packet data in the neutral format from the plurality of network interconnection points. A system includes a communications node operable to sample data packets flowing through and generate sample packet data in a specified format, a collector node operable to convert the sampled packet data into a neutral format, the collector node further operable to map IP addresses of the sampled packet data to corresponding prefixes in a routing table; and an aggregator node operable to aggregate neutrally formatted sampled packet data from a plurality of collector nodes.

20 Claims, 9 Drawing Sheets

(56) References Cited

U.S. PATENT DOCUMENTS

| | | | |
|---|---|---|---|
| 6,009,081 | A | 12/1999 | Wheeler et al. |
| 6,038,600 | A | 3/2000 | Faulk et al. |
| 6,069,895 | A | 5/2000 | Ayandeh |
| 6,094,682 | A | 7/2000 | Nagasawa |
| 6,178,235 | B1 | 1/2001 | Petersen et al. |
| 6,377,987 | B1 | 4/2002 | Kracht |
| 6,385,649 | B1 | 5/2002 | Draves et al. |
| 6,411,997 | B1 | 6/2002 | Dawes et al. |
| 6,421,434 | B1 | 7/2002 | Rosu |
| 6,501,752 | B1 | 12/2002 | Kung et al. |
| 6,539,455 | B1 | 3/2003 | Khanna et al. |
| 6,574,663 | B1 | 6/2003 | Bakshi et al. |
| 6,584,093 | B1 | 6/2003 | Salama et al. |
| 6,598,034 | B1 | 7/2003 | Kloth |
| 6,618,755 | B1 | 9/2003 | Bonn |
| 6,633,585 | B1 | 10/2003 | Ghanwani et al. |
| 6,651,096 | B1 | 11/2003 | Gai et al. |
| 6,728,215 | B1 | 4/2004 | Alperovich et al. |
| 6,728,777 | B1 | 4/2004 | Lee et al. |
| 6,763,000 | B1 | 7/2004 | Walsh |
| 6,801,534 | B1 | 10/2004 | Arrowood et al. |
| 6,850,528 | B1 | 2/2005 | Crocker |
| 6,853,639 | B1 | 2/2005 | Watanuki et al. |
| 7,035,934 | B1* | 4/2006 | Lin .......................... 709/238 |
| 7,185,103 | B1* | 2/2007 | Jain .......................... 709/234 |
| 7,554,930 | B2 | 6/2009 | Gaddis et al. |
| 7,756,128 | B2* | 7/2010 | Barrett et al. ............. 370/389 |
| 2002/0002686 | A1 | 1/2002 | Vange et al. |
| 2002/0120767 | A1* | 8/2002 | Oottamakorn et al. ...... 709/235 |
| 2003/0131263 | A1 | 7/2003 | Keane et al. |
| 2003/0145246 | A1 | 7/2003 | Suemura |
| 2003/0225549 | A1* | 12/2003 | Shay et al. ................ 702/182 |
| 2005/0286434 | A1* | 12/2005 | McKee et al. ............. 370/252 |
| 2006/0067240 | A1 | 3/2006 | Kim et al. |
| 2006/0253606 | A1* | 11/2006 | Okuno ...................... 709/238 |
| 2007/0076606 | A1 | 4/2007 | Olesinski et al. |
| 2009/0323544 | A1 | 12/2009 | Gaddis et al. |

FOREIGN PATENT DOCUMENTS

| | | |
|---|---|---|
| EP | 1318629 A2 | 6/2003 |
| JP | 03191541 | 8/1991 |
| JP | 03078171 | 3/2003 |
| WO | WO-98/20724 A2 | 5/1998 |
| WO | WO-98/20724 A3 | 10/1998 |
| WO | WO-00/38381 A1 | 6/2000 |

OTHER PUBLICATIONS

International Searching Authority, Korean Intellectual Property Office, Written Opinion (Form PCT/ISA/237) for International application No. PCT/US2008/068906, International Filing Date: Jul. 1, 2008, 3 pages.
Zander, S. et al., "Automated Traffic Classification and Application Identification using Machine Learning", Local Computer Networks, 2005, 30th Anniversary. The IEEE Conference on Nov. 15-17, 2005, pp. 250-257.
Kim, S.S. et al., "Modeling Network Traffic as Images", Communications, 2005, ICC 2005, IEEE International Conference on vol. 1, May 16-20, 2005, vol. 1, pp. 168-172.
Wikipedia, the free encyclopedia, *Netflow,network protocol developed by Cisco Systems*, http://en.wikipedia.org/wiki/Netflow, Aug. 5, 2008, pp. 1-5.
Wikipedia, the free encyclopedia, *sFlow, standard for monitoring computer networks*, http://en.wikipedia.org/wiki/SFLow, May 24, 2007, pp. 1-2.
P. Phaal, S. Panchen and N. McKee, *InMon Corporation's sFlow: A Method for Monitoring Traffic in Switched and Routed Networks*, Network Working Group, InMon Corp., Sep. 2001, http://www.ietf.org/rfc/rfc3176.txt, Aug. 5, 2008, pp. 1-29.
*sFlow*, NetworkWorld Research Center: Network/Systems Mgmt., http://www.networkworld.com/details/6416.html?def, May 23, 2007, pp. 1-4.
"Internet Usage Platform: Transforming Internet Services Into Revenue", HP/Cisco, http://www.hp.com/unitedstates/business/nsp/usage/infolibrary/solutions/cisco.pdf 1998, 1-5.
"White Paper: Netflow Services and Applications", *Cisco Corp.* 1999, 1-27.
Duffield, N.G et al., "Trajectory sampling for direct traffic observation", *SIGCOMM'00* 2000, 271-282.
""More About InterAgent'" Software", *Enron Corp.*; http://www.ec.enron.com/isp/ein/more_interagent.html;_Enron:_ISPs;_Enron_Broadband_Services; Copyright 1997-2000. [retrieved May 8, 2000], pp. 1,2.
"A Border Gateway Protocol 4 (BGP-4)", http://info.internet.isi.edu/in-notes/rfc/files/rfc1771.txt; Network Working Group, Requests for Comments: 1771, Obsoletes: 1654, Category: Standards Track; Editors: Y. Rekhter, T.J. Watson; Research Center, IBM Corp., T. Li, Cisco Systems, [retrieved on Mar. 27, 2000] Mar. 1995, 1-50.
"About Enron Broadband Services", *Enron Broadband Services, Inc.*; http://www.ec.enron.com/about/; Copyright 1997-2000.. Enron Corp.; [retrieved on May 2, 2000], pp. 1,2.
"Application of the Border Gateway Protocol in the Internet", http://info.internet.isi.edu/in-notes/rfc/files/rfc177.txt; Network Working Group Requests for Comments: 1772, Obsoletes: 1655, Category: Standards Track; Editors: Y. Rekhter, TJ. Watson; Research Center, IBM Corp., P. Gross, MCI [retrieved on Mar. 27, 2000] Mar. 1995, 1-17.
"BizRate.com Selects InterNAP's High Performance Internet Connectivity", http://www.internap.com/htmUnews_pr_02102000.htm; *InterNAP: Press Release; INTERNAP© Network Services* [retrieved on Feb. 10, 2000], pp. 1-3.
"Cisco Systems Inc. Using the Border Gate Protocol for Interdomain Routing", http://www.cisco.com/univercd/cd/td/doc/cisintwk/ics/icsbgp4.htm Copyright 1989-2000©. Posted Wed. Feb. 9 13:25 PST 2000. [retrieved May 8, 2000], pp. 1-65.
"How it works", http://www.internap.com/html.howbotright.htm; *InterNAP's Technology Works; INTERNAp© Network Services* [retrieved on Feb. 10, 2000], pp. 1-3.
"PAXON, Measurements and Analysis of End-to-End Internet Dynamics", *Chapter 8,Routing Symmetry*, (Jun. 1997), 92-100.
"Search report dated Aug. 21, 2007", from corresponding Chinese Patent Appln. No. 200510056380.1.
"Search report dated Sep. 19, 2007", from corresponding Japanese Patent Appln. No. 2004-266923.
"Why is the Internet so slow", http://www:internap.com/htmUwhy_botright.htm; *InterNAP; Why The Internet Is So Slow;INTERNAP© Network Services* [retrieved on Feb. 10, 2000], pp. 1,2.
Rekhter, Y. et al., "BGP-4 Application", (RFC 1772) Mar. 1995, p. 10.
, "International Preliminary Report on Patentability, dated Jan. 21, 2010", PCT/US08/68906, filed Jul. 1, 2008, 4 pgs.
Canada Examination Report, dated Oct. 25, 2012, Application No. 2693480, 5 pgs.
Extended European Search Report, dated Jun. 26, 2013, Application No. 08772306.0, 9 pgs.
Mao, Zhuoqing M. et al., "Towards an Accurate AS-Level Traceroute Tool", *ACM* 2 Penn Plaza, Suite 701, New York USA; XP040166590 Aug. 29, 2003, 365-378.
Canadian Examination Report, dated Jan. 31, 2014, Application No. 2,693,480, filed Jul. 1, 2008; 3 pgs.
European Examination Report, dated Apr. 2, 2014, Application No. 08772306.0, filed Jul. 1, 2008; 6 pgs.
Canadian Examination Report, dated Jan. 29, 2015, Application No. 2,693,480, filed Jul. 1, 2008; 4 pgs.

\* cited by examiner

| Peer Outbound Distribution Report | |
|---|---|
| Peer AS n Sends Traffic To: | Volume |
| Peer | Volume |
| Peer 1 | Volume Sent to Peer 1 |
| ... | ... |
| Peer i | Volume Sent to Peer i |

FIG. 3a

| Peer Inbound Distribution Report | |
|---|---|
| Peer AS n Receives Traffic From: | Volume |
| Peer | Volume |
| Peer 1 | Volume Received from Peer 1 |
| ... | ... |
| Peer i | Volume Received from Peer i |

FIG. 3b

| AS n On-Net/Off-net Outbound Distribution Report | |
|---|---|
| On/Off | Volume |
| On-Net | Volume Sent On-Net from AS n |
| Off-Net | Volume Sent Off-Net from AS n |

FIG. 4a

| AS n On-Net/Off-net Inbound Distribution Report | |
|---|---|
| On/Off | Volume |
| On-Net | Volume Received On-Net by AS n |
| Off-Net | Volume Received Off-Net by AS n |

FIG. 4b

| AS n Outbound Distribution to Top 10 Customers Report ||
|---|---|
| Customer Name | Volume |
| Customer 1 | Volume Sent to Customer 1 from AS n |
| Customer 2 | Volume Sent to Customer 2 from AS n |
| ... | ... |
| Customer 10 | Volume Sent to Customer 10 from AS n |

FIG. 5a

| AS n Inbound Distribution from Top 10 Customers Report ||
|---|---|
| Customer Name | Volume |
| Customer 1 | Volume Sent from Customer 1 to AS n |
| Customer 2 | Volume Sent from Customer 2 to AS n |
| ... | ... |
| Customer 10 | Volume Sent from Customer 10 to AS n |

FIG. 5b

600 — Highest Traffic Volume AS's

| 602 | 604 | 606 | 608 | 610 | 612 | 614 |
|---|---|---|---|---|---|---|
| AS | Average Volume | Top Region | On-net/Off-net | Direction | Next Hop AS's | Upstream AS's |
| AS 1 Name | Average Volume Sent from or to AS 1 | Region ID (%) | On or Off net (%) | Source or Sink (%) | Next Hop AS #(s) | Upstream AS #(s) |
| AS 2 Name | Average Volume Sent from or to AS 2 | Region ID (%) | On or Off net (%) | Source or Sink (%) | Next Hop AS #(s) | Upstream AS #(s) |
| ... | ... | ... | ... | ... | ... | ... |
| AS n Name | Average Volume Sent from or to AS n | Region ID (%) | On or Off net (%) | Source or Sink (%) | Next Hop AS #(s) | Upstream AS #(s) |

FIG. 6a

616 — Highest Traffic Volume by Application or Protocol

| 618 | 620 | 622 | 624 | 626 | 628 |
|---|---|---|---|---|---|
| Application/Protocol ID | Average Volume | Average EU to EU Volume | Average EU to NA Volume | Average NA to EU Volume | Average NA to NA Volume |
| App/Protocol 1 ID | Average Volume of App/ Protocol 1 Traffic (Mb/s) | App/Protocol 1 Avg EU to EU Volume | App/Protocol 1 Avg EU to NA Volume | App/Protocol 1 Avg NA to EU Volume | App/Protocol 1 Avg NA to NA Volume |
| App/Protocol 2 ID | Average Volume of App/ Protocol 2 Traffic (Mb/s) | App/Protocol 2 Avg EU to EU Volume | App/Protocol 2 Avg EU to NA Volume | App/Protocol 2 Avg NA to EU Volume | App/Protocol 2 Avg NA to NA Volume |
| ... | ... | ... | ... | ... | ... |
| App/Protocol n ID | Average Volume of App/ Protocol n Traffic (Mb/s) | App/Protocol n Avg EU to EU Volume | App/Protocol n Avg EU to NA Volume | App/Protocol n Avg NA to EU Volume | App/Protocol n Avg NA to NA Volume |

Trends in Highest Traffic Volume by Application or Protocol

| Application/Protocol ID 702 | Average Trended (1yr, Mb/s) 704 | Average CAGR (Mb/s) 706 | Average Trended (1yr, %) 708 | Average CAGR (%) 710 |
|---|---|---|---|---|
| App/Protocol 1 ID | 1yr Change in Avg Volume of App/Protocol 1 Traffic (Mb/s) | Avg CAGR of Traffic Volume for App/Protocol 1 (Mb/s) | 1yr Change in Avg Volume of App/Protocol 1 Traffic (%) | Avg CAGR of Traffic Volume for App/Protocol 1 (Mb/s) |
| App/Protocol 2 ID | 1yr Change in Avg Volume of App/Protocol 2 Traffic (Mb/s) | Avg CAGR of Traffic Volume for App/Protocol 2 (Mb/s) | 1yr Change in Avg Volume of App/Protocol 2 Traffic (%) | Avg CAGR of Traffic Volume for App/Protocol 2 (Mb/s) |
| ... | ... | ... | ... | ... |
| App/Protocol n ID | 1yr Change in Avg Volume of App/Protocol n Traffic (Mb/s) | Avg CAGR of Traffic Volume for App/Protocol n (Mb/s) | 1yr Change in Avg Volume of App/Protocol n Traffic (%) | Avg CAGR of Traffic Volume for App/Protocol n (Mb/s) |

City to City Traffic Flow Report

| Date 714 | Source City 716 | Destination City 718 | Average Volume (Mb/s) 720 |
|---|---|---|---|
| Date | Source City 1 ID | Dest. City k ID | Avg Traffic Volume sent from Src to Dest. |
| Date | Source City 1 ID | Dest. City k ID | Avg Traffic Volume sent from Src to Dest. |
| ... | ... | ... | ... |
| Date | Source City n ID | Dest. City k ID | Avg Traffic Volume sent from Src to Dest. |

FIG. 7b

SYSTEM AND METHOD FOR AGGREGATING AND REPORTING NETWORK TRAFFIC DATA

RELATED APPLICATIONS

This application claims the benefit of U.S. Provisional Application No. 60/948,960, filed Jul. 10, 2007, which is incorporated by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2008 Level 3 Communications, LLC.

TECHNICAL FIELD

Embodiments of the present invention generally relate to network communications. More specifically, embodiments relate to a system and method for aggregating and reporting network traffic data.

BACKGROUND

Network service providers want to understand flow of communications traffic and traffic flow changes over the network for purposes of capacity planning, marketing and other reasons. For example, it is important to know if traffic through a gateway is increasing, in order to know whether routers should be added to the gateway. It may also be helpful to know whether traffic from a particular customer, such as an Internet service provider (ISP), is increasing or decreasing to understand how to provide better service to the ISP. Some tools, such as sFlow and Netflow, are available that attempt to provide information about traffic flow by sampling packet data through IP networks.

For example, a Netflow agent running on a router can provide data such as packet source IP address, destination IP address and port numbers. In addition to these, the autonomous system (AS) may be identified by a sFlow agent. Because currently available tools gather traffic flow information at a packet level, these tools obtain relatively low-level information such as source or destination IP addresses. However, these tools are unable to provide information such the city or ISP that the packets are originating from or going to. As such, currently available traffic analysis tools are not capable of providing a view of traffic flow or changes in traffic flow as it relates to other business aspects of the network service provider.

It is with respect to these and other problems that embodiments of the present invention have been created.

SUMMARY

Embodiments of systems and methods can use sampled packet data to determine traffic flow statistics associated with one or more attributes, such as, but not limited to geographic region, network, community, application, protocol, autonomous system, or customer. Traffic flow statistics can be measures of traffic volume associated with an attribute. For example, traffic volume measurements can be generated that indicate the traffic volume that is inbound to or outbound from an autonomous system network. As another example, traffic volume measurements can be generated that reflect the volume of traffic that is on-net and the volume of traffic that is off-net with respect to a selected network.

An embodiment of a method for analyzing traffic in a communications network includes sampling data packets at a plurality of network interconnection points, wherein sampling the data packets includes generating a plurality of sampled packet data in one or more standardized formats, converting the sampled packet data from the one or more standardized formats into a neutral format, and aggregating the sampled packet data in the neutral format from the plurality of network interconnection points.

In at least one embodiment of the method the IP prefixes are obtained from a routing table. The method may further include converting the sampled packet data from one or more standardized formats into a neutral format. Enriching the sampled packet data may include mapping IP addresses in the sampled packet data to geographic locations. Enriching the sampled packet data may include mapping IP addresses in the sampled packet data to customers. The plurality of standardized formats may include one or more of sFlow format, Netflow format and cflowd format. The geographic locations may include one or more of a city, a country, a continent or a region.

An embodiment of the method further includes generating one or more traffic flow reports based on the sampled packet data. The one or more reports may include one or more of a peer distribution report including one or more of traffic volume measurements of traffic outbound from a peer network or traffic volume measurements of traffic inbound to a peer network, a customer distribution report including on or more of traffic volume measurements of traffic outbound from one or more customer networks or traffic volume measurements of traffic inbound to one or more of customer networks, an autonomous system distribution report including average traffic volume, traffic volume by region, on-net traffic volume, off-net traffic volume, direction of traffic, next hop autonomous systems, and upstream autonomous systems associated with one or more autonomous systems, an applications report including average traffic volume and region to region traffic volume associated with network applications, an on-net distribution report includes traffic volume measurements of traffic outbound from a peer network that was also inbound to the peer network, an off-net distribution report includes traffic volume measurements of traffic outbound from a peer network that was not also inbound to the peer network, a region distribution report including average traffic volume inbound to or outbound from selected regions, and a city distribution report including average traffic volume from one or more source cities to one or more destination cities.

In an embodiment of the method enriching the sample packet data includes generating one or more sampled packet data summaries at a collector node by mapping the sampled packet data to routing table data from communication nodes associated with the collector node. The method may further include communicating the one or more sampled packet data summaries from the collector nodes to an aggregator node configured to perform the aggregating.

An embodiment of a system includes a communications node operable to sample data packets flowing through and generate sample packet data in a specified format, a collector node operable to convert the sampled packet data into a neutral format, the collector node further operable to map IP addresses of the sampled packet data to the network (or prefix) they belong to in a routing table, and an aggregator node operable to aggregate neutrally formatted sampled packet data from a plurality of collector nodes. The IP prefixes may be associated with respective autonomous systems, and wherein the collector node is further operable to map sampled packet data to associated autonomous systems. The aggregator node may be further operable to generate traffic flow measures associated with autonomous systems communicating over the communications network.

An embodiment of the system may further include an autonomous system (AS) registry storing information about autonomous systems including AS identifier and region. The system may further include a customer attributes data store storing customer AS identifiers. The aggregator node may be further operable to map AS identifiers from the sampled packet data to regions in the AS registry. Further still, the aggregator node may be operable to generate traffic flow measurements associated with network applications based on the neutrally formatted sampled packet data. Still further, the aggregator node may be operable to generate one or more reports relating traffic flow measurements to one or more of a region, an autonomous system, a community, a network application, or a network protocol. At least one of the one or more reports may include traffic flow measurements for traffic flowing from a selected community to at least one other community.

In at least one embodiment of the system the aggregator is further operable to generate a traffic flow measurement of outbound traffic from a selected AS to each of a plurality of other AS's. The aggregator may be further operable to generate a traffic flow measurement of outbound traffic to a selected AS from each of a plurality of other AS's. Further still, the aggregator may be operable to generate a traffic flow measurement of on-net traffic and a traffic flow measurement of off-net traffic for a selected AS.

Another embodiment of a method for analyzing communications traffic through a network includes sampling data packets communicated through the network, categorizing each data packet according one or more network-related attribute categories, aggregating data packets of each of the attribute categories, and determining data packet transmission statistics associated with each of the one or more attribute categories based on the aggregation. The one or more attribute categories may include one or more of geographic region, network, community, application, protocol, autonomous system, customer, on-net, or off-net. Determining data packet transmission statistics may include determining data packet volume transmitted to or from one or more of a geographic region, a network, a community, an autonomous system, a customer, an on-net provider, or an off-net provider.

BRIEF DESCRIPTION OF THE DRAWINGS

FIGS. 3-7 illustrate exemplary reports that can be generated using embodiments of aggregating and reporting systems shown in FIGS. 1-2.

Figure 1:
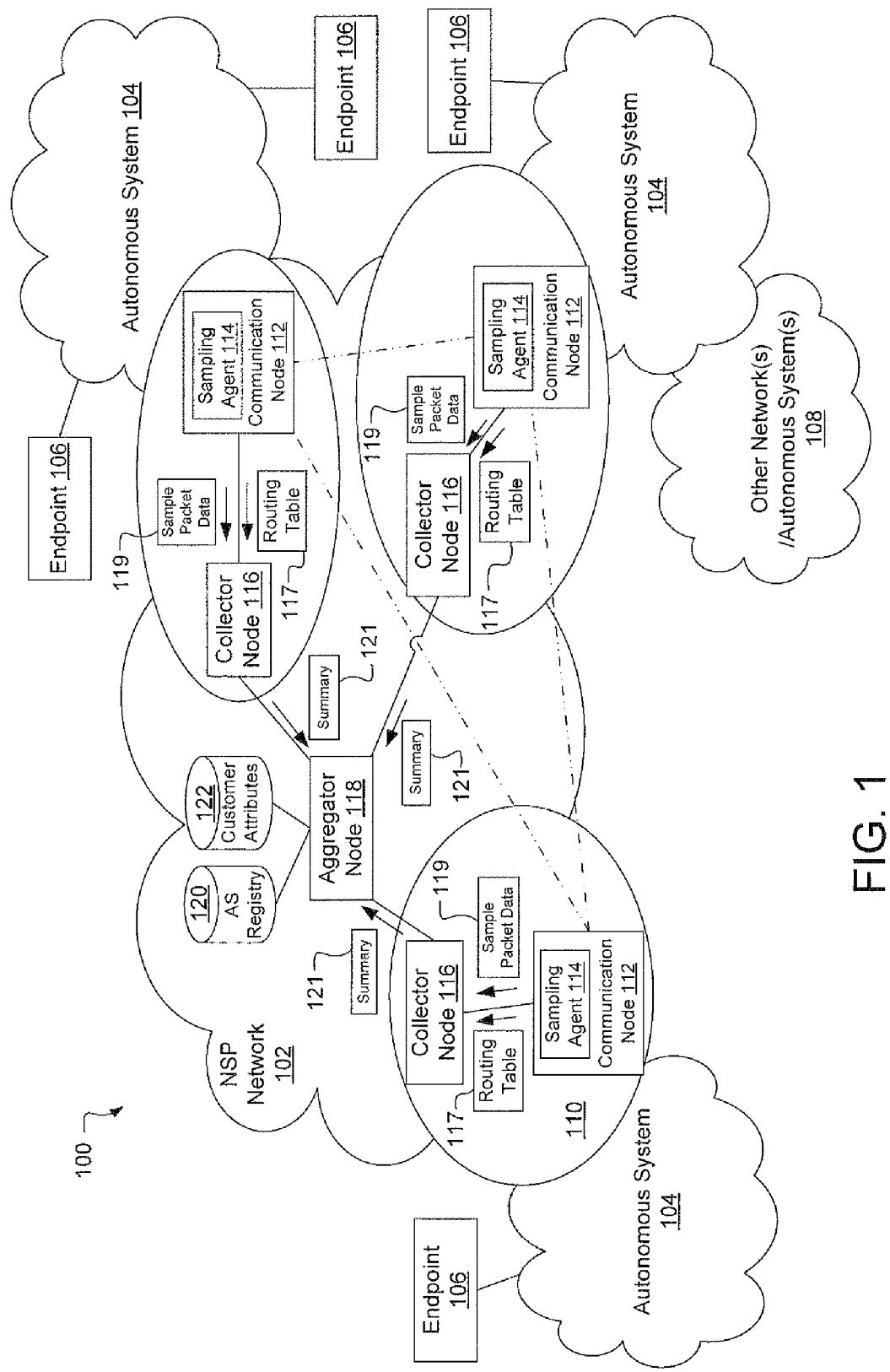
FIG. 1 illustrates an operating environment suitable for practicing traffic flow data aggregation and reporting in accordance with various embodiments of the present invention.

While the invention is amenable to various modifications and alternative forms, specific embodiments have been shown by way of example in the drawings and are described in detail below. The intention, however, is not to limit the invention to the particular embodiments described.

DETAILED DESCRIPTION

Embodiments of systems and methods can use sampled packet data to determine traffic flow statistics associated with one or more network-related attribute categories, such as, but not limited to geographic region, network, community, application, protocol, autonomous system, customer, on-net or off-net. Traffic flow statistics can be measures of traffic volume associated with an attribute. For example, traffic volume measurements can be generated that indicate the traffic volume that is inbound to or outbound from an autonomous system network. As another example, traffic volume measurements can be generated that reflect the volume of traffic that is on-net and the volume of traffic that is off-net with respect to a selected network.

Some embodiments of the present invention relate to systems and methods for aggregating and reporting traffic flow data captured in a communications network. Various embodiments sample packets of data flowing through the communications network and derive aggregated traffic flow from the sampled packets. Data in sampled packets are mapped to routing data descriptive of routes in the communications network, thus enriching the sampled packet data. By enriching sampled packet data with routing data, traffic flow can be derived in relation to relevant attributes, such as autonomous systems, geographical regions, NSP customers, NSP noncustomers, peers, on-net or off-net distribution, network applications or protocols. For example, total traffic flow between AS's, peers or communities can be determined. Reports can include traffic flow statistics in relation to various attributes. For example, traffic volume measurements can be used to report traffic volume between AS's, peers or communities, as well as on-net/off-net, customer and noncustomer distribution, or traffic associated with selected applications or protocols.

A method for analyzing communications traffic through a network includes sampling data packets communicated through the network, categorizing each data packet according one or more network-related attribute categories, aggregating data packets of each of the attribute categories, and determining data packet transmission statistics associated with each of the one or more attribute categories based on the aggregation. The one or more attribute categories may include one or more of geographic region, network, community, application, protocol, autonomous system, customer, on-net, or off-net. Determining data packet transmission statistics may include determining data packet volume transmitted to or from one or more of a geographic region, a network, a community, an autonomous system, a customer, an on-net provider, or an off-net provider.

Prior to describing one or more preferred embodiments of the present invention, definitions of some terms used throughout the description are presented.

Definitions

The term "network service provider" refers to an organization or business that provides network access to one or more customers. An NSP may operate, for example, a backbone network and/or edge networks coupled to a plurality of other networks, whereby the other networks can communicate with each other and the Internet via the NSP network(s).

The term "customer" refers to an entity that uses services provided by an NSP. For example, the customer may pay the NSP for carrying traffic over the NSP's network.

A "node" is a uniquely addressable functional device on (i.e., communicatively coupled to) a network. A node may be any type of computer, server, gateway device, or other.

"Traffic", "communication traffic" or "network traffic" refer to the flow of data or messages in a network.

A "module" is a self-contained functional component. A module may be implemented in hardware, software, firmware, or any combination thereof.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The terms "responsive" and "in response to" includes completely or partially responsive.

A computer program product can take the form of one or more computer-readable media. The term "computer-readable media" is media that is accessible by a computer, and can include, without limitation, computer storage media and communications media. Computer storage media generally refers to any type of computer-readable memory, such as, but not limited to, volatile, non-volatile, removable, or non-removable memory. Communication media refers to a modulated signal carrying computer-readable data, such as, without limitation, program modules, instructions, or data structures.

Exemplary System

FIG. 1 illustrates an exemplary operating environment 100 in which traffic flow aggregation and reporting may be carried out in accordance with embodiments of the present invention. The operating environment 100 includes a network service provider (NSP) network 102 that operably interconnects multiple autonomous systems (AS) 104. The NSP network 102 provides communication service between the AS's 104. More specifically, the NSP network 102 supplies network bandwidth and routing functionality to the AS's 104 to route data packets between endpoints 106 logically located in the AS's 104.

In one embodiment, the NSP network 102 comprises a managed backbone network providing wholesale network service. The NSP could provide services commonly provided by an ISP. For example, the NSP could provide email, web site hosting, caching, and content serving. The AS's 104 may include, for example, Internet service providers (ISPs) networks, other NSP networks, enterprise networks, Regional Bell Operating Companies (RBOC) networks, cable company networks, content distribution networks (CDNs), web sites, and application service provider (ASP) networks. The endpoints 106 are communications devices used by, for example, private users, enterprises, or web sites. One or more of the AS's 104 may interconnect with other networks or AS's 108 to facilitate communication to and from the other networks/AS's 108. The NSP network 102, autonomous systems 104, and other network/AS's 108 may include any combination of wireless or wireline networks.

The autonomous systems 104 interconnect with the NSP network 102 at network interconnection points (NIP) 110. A NIP 110 may be, for example, an Internet exchange point (IXP), a network access point (NAP), a gateway, a point of presence (POP), a peering point, or a regional switching point. Data packets are routed through the NIPs 110 to and from autonomous systems 104 via the NSP network 102. The data packets can pertain to various different applications, such as, but not limited to, simple mail transport protocol (SMTP) applications (e.g., email), hypertext transport protocol (HTTP) applications, teinet applications, or peer-to-peer (p2p) applications.

In various embodiments, the AS's 104 may be peers of other AS's 104 and the NSP network 102 and/or the AS's 104 may be customers of the NSP, For example, an AS 104 may provide backbone network service like the NSP network 102; or, the AS 104 may be a website or web content host that subscribes to backbone service provided by the NSP network 102. Some AS's 104 may act as both a peer and customer to the NSP network 102.

The NSP network 102 includes numerous communication nodes 112 that include routing or switching functionality, for routing packets through the NSP network 102 and to/from one or more AS's 104. For simplicity, only a few communication nodes 112, and only a few AS's 104, are shown in the embodiment of FIG. 1. The communication nodes 112 may be, by way of example, routers or switches. In order to effectively handle communication traffic flowing over the NSP network 102 between AS's 104, it is useful to understand the nature of traffic flow into, out of, and/or through the NSP network 102.

Accordingly, at least some of the communication nodes 112 include sampling agents 114 that sample packets flowing through the communication nodes 112. The sampling agents 114 may sample packets according to a sampling standard, such as, but not limited to sFlow, Netflow, or cflowd. Each of these standards yield sample packet data in a specified format that may differ from one standard to another. Generally the sampling agents 114 sample 1 in N packets, where N can be set by the manufacturer or configured by a user (e.g., a network administrator). The particular sampling protocol employed in a communication node 112 may depend upon the make or model of the communication node 112. For example, Cisco™ routers typically employ Netflow, Juniper™ routers employ cflowd, and Force10™ routers employ sFlow.

Typically, the sampling agents 114 generate datagrams or other units of data that include specified information obtained from the sampled packets. The sample packet data 119 generally includes at least the source IP address, destination IP address, port numbers, and protocol associated with the sampled packet. Some sampling standards, such as sFlow, also obtain autonomous system numbers associated with the sampled packet. Sampled packet data 119 are sent from the communication nodes 112 to collector nodes 116. In addition, each collector node 116 obtains a routing table 117 from the respective communication node 112. In some embodiments the routing table 117 is sent over a routing feed that is separate from the sample packed data 119. The collector node 116 uses the sample packet data 119 and the routing table 117 to generate a summary 121 of sampled packets flowing through the network interconnection point 110.

To generate the summary 121, a collector node 116 first converts the sample packet data 119 from the sampling standard(s) used by the sampling agent 114 into a neutral format. For example, sample packet data 119 in the sFlow format, the Netflow format or the cflowd format are converted into a neutral format that is commonly used by the collector nodes 116 (and later the aggregator nodes 118). Typically the neutral format differs from the standard formats, but this is not required. In one embodiment, the neutral format is a unified assembly of specified units of data from the sample packet data 119 in a format that is common across all summaries 121 and collector nodes 116. In various embodiments, after the collector nodes 116 receive sample packet data 119 from the sample agents 114, the collector nodes 116 identify each of the specified data (e.g., source and destination IP addresses) in the sample packet data 119, extract the data, convert the data into common units, as may be necessary, and assemble the data into the neutral format.

The routing table 117 from a communication node 112 indicates available routes over which packets can be sent to reach their destinations. The routing table 117 includes a list of networks (or prefixes) to which IP addresses belong that the collector node 116 correlates with destination IP addresses in the sample packet data 119. In addition to the destination IP prefixes of routes, the routing table includes AS numbers for all AS's in the route. In various embodiments, the routing table 117 includes information about communities associated with the routes. A community is generally a group of network nodes that have some common attribute. For example, a community may be a geographic area, such as a city, a country, a continent or a region. Using the community data, the collector node 116 can map IP addresses in the sampled packet data 119 to communities identified in the routing table 117.

The routing table 117 also indicates whether the IP prefixes are in autonomous systems that are customers or not customers of the NSP network 102. In addition, the routing table 117 can include information about the destination router associated with each route, By mapping IP address data in the sample packet data to corresponding IP prefixes in the routing table 117, each collector node 116 can generate one or more summaries 121 of packet flow in the associate NIP 110. In some embodiments the format and contents of the summaries 121, as well as the timing of generation, are configurable by the user.

In one embodiment, the collector node 116 enriches sample packet data using the data in the routing table 117. For example, a collector node 116 could generate a summary including a mapping of AS numbers to source and destination IP addresses of sampled packets. As another example, the collector node 116 could generate a summary 121 including a mapping of source and destination IP addresses to city, country, continent or region. The summaries 121 may be generated by the collector nodes 116 automatically or on demand. For example, the summaries 121 may be generated periodically (e.g., once daily, weekly or monthly). Alternatively or in addition, summaries 121 may be generated in response to certain events. For example, summary 121 generation may be triggered by an increase or decrease in traffic flow that exceeds a set threshold. One exemplary embodiment of enriched sample packet data is shown below:

[nfr]
sa:75.126.53.172
da:82.206.143.35
nh:4.68.122.158
ii:66
oi:85
pa:1
oc:46
fi:198857563
la:198861211
sp:80

-continued dp:1590
fl:0x0
pr:6
to:0x0
ds:12179
ss:22351
sl:16
dl:24
BV:default
SR:75.126.0.0/16
SN:4.69.185.162
SS:12179 12179 36351
SC:3356:3 3356:22 3356:100 3356:123 3356:575 3356:2008
DR:82.206.143.0/24
DN:4.69.185.2
DS:22351
DC:3356:3 3356:22 3356:100 3356:123 3356:575 3356:2010 22351:4001

The summaries 121 that are generated by the collector nodes 116 are sent to one or more aggregator nodes 118. An aggregator node 118 is operable to apply additional data to the summaries from the network interconnection points 110 to generate reports of traffic flow through the NSP network 102 as a whole and to further correlate features of the traffic flow with AS's 104 that interconnect with the NSP network 102. In the illustrated embodiment, the aggregator node 118 uses an AS registry 120 and customer attributes data 122 to derive other correlations between data and further enrich the data in the traffic flow report.

The AS registry 120 provides information about autonomous systems worldwide. Such AS information can include the AS name, number, country, continent, region, and so on. The aggregator 118 can use the AS registry 120, for example, to map AS numbers identified in the summaries 121 to AS names, countries and/or regions. The customer attributes data 122 is typically an internal database of the NSP network 102 that stores various types of data about customers of the NSP. The customer data is gathered over time based on the NSP's understanding of the customers. For example, but without limitation, the customer attributes data 122 can store customer preferences, historical average traffic volume, interface device types or specifications, as well as customer AS numbers with their associated customer name, which may differ from the publicly known name in the AS registry 120.

In some embodiments the aggregator nodes 118 derive statistics, such as a measure of total traffic flow, associated with one or more network-related attribute categories, such as AS's 104, communities, customers, noncustomers, on-net, off-net, peers, application, protocol. In an embodiment, total traffic flow can be determined by extrapolating the number of sampled packets associated with a given attribute category. This extrapolation can involve multiplying the total number of sampled packets with a particular characteristic (e.g., associated with a particular peer, AS, customer, etc.) with the sampling factor used by the sampling agent 114.

For example, if the sampling agent 114 samples one packet in every 'N' packets, and samples 20 packets associated with a particular peer network, then the total packet flow attributed to the peer network is derived by multiplying N times 20. As another example, if 50 packets are sampled from a selected AS and 15 packets of the 50 are sent off the AS network and the remainder are sent back on the AS network, N times 15 yields the off-net traffic flow, and N times 35 yields the on-net traffic flow associated with the selected AS. The aggregator nodes 118 can generate reports on demand or automatically or both. The reports may be configured by the user to present certain data in certain ways. Exemplary embodiments of collector nodes, aggregator nodes, and their functions and outputs are discussed further below.

Figure 2:
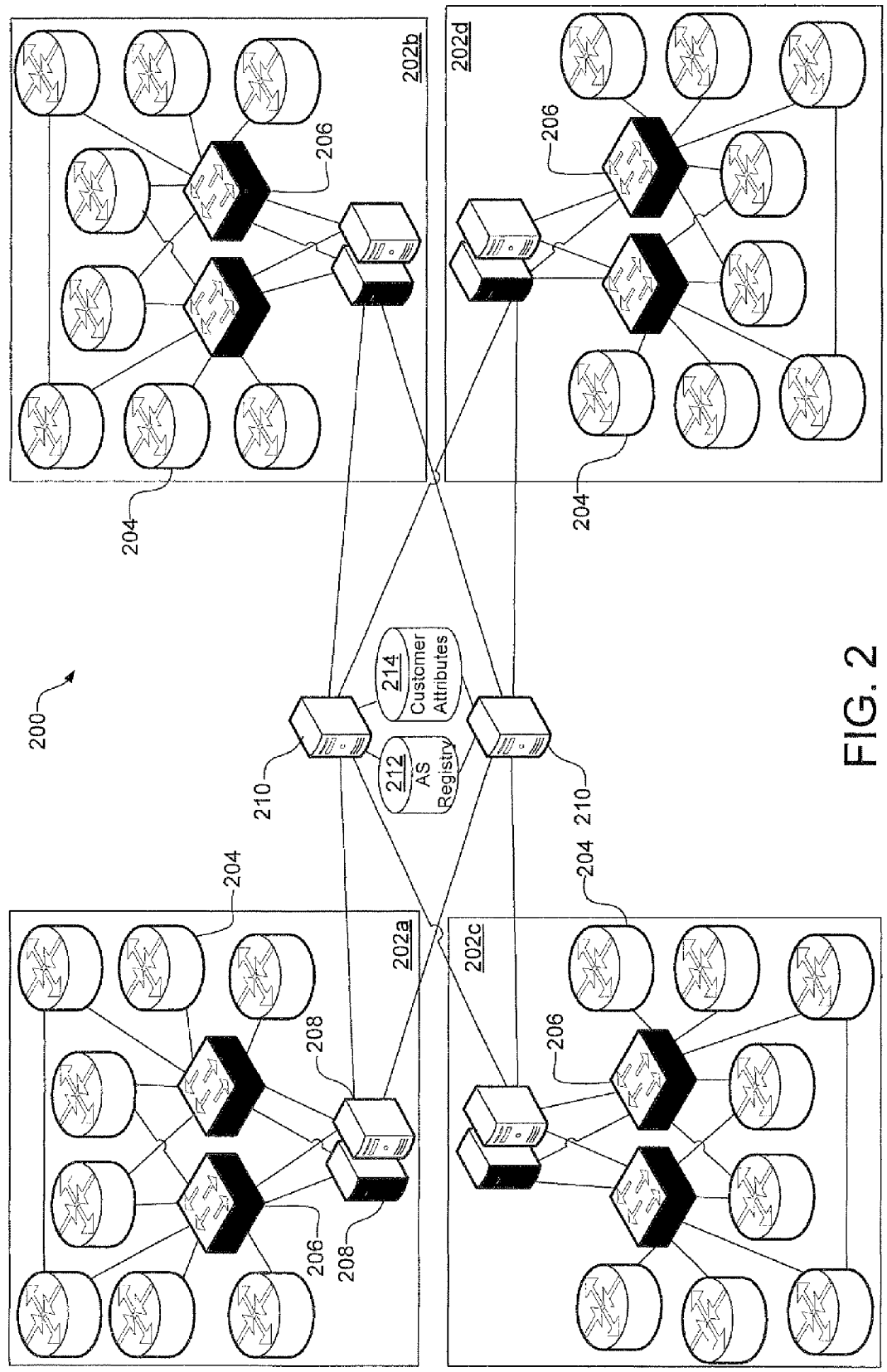
FIG. 2 illustrates a network configuration for carrying out traffic flow data aggregation and reporting in accordance with the embodiment of FIG. 1.

For example, FIG. 2 illustrates an exemplary embodiment of a traffic flow aggregation and reporting system 200 in accordance with the embodiment of FIG. 1. The exemplary system 200 includes four gateways: 202a, 202b, 202c, and 202d. In general, a gateway 202 is a point of contact between two networks. The gateways 202 typically, but not necessarily, perform protocol conversion between the networks. Each gateway 202 includes multiple routers 204 and two core switches 206. The numbers of gateways 202, routers 204, and core switches 206 shown in FIG. 2 are for illustrative purposes only; it will be understood by those skilled in the art that a typical network may include more or fewer gateways, routers and switches than those shown in FIG. 2.

Each gateway 202 includes two collectors 208. In this particular example, the collectors 208 are implemented as server computers. In this embodiment two collectors 208 are provided for redundancy, but in general, more or fewer collectors may be installed at each gateway. The collectors 208 at each gateway 202 are coupled to respective core switches 206 in the gateway 202. Further, the core switches 206 are coupled to multiple routers 204. The routers 204 include sampling agents that sample packet data that flows through the gateway 202. Each collector 208 includes an application that converts and summarizes sample packet data from routers 204. In addition, a routing feed exists between each core switch 206 and the collectors 208, whereby the routing tables, sample packet data, and/or other data of the routers 204 can be sent to the collectors 208. The collectors 208 use the routing table data to summarize the sample packet data.

The system 200 includes two aggregators 210 implemented as server computers in this particular example. Two aggregators 210 are used here for redundancy; however, in other implementations more or fewer aggregators may be used. The aggregators 210 may or may not be geographically distant from the collectors 208 or each other. For example, one aggregator 210 may be located in Atlanta, Ga., and another in Denver, Colo. The aggregators 210 use one or more AS registry databases 212 and one or more customer attribute databases 214 to map sampled packet data to other data relevant to marketing, capacity planning and/or security. For example, data in the sampled packet data may be mapped to AS's, peer networks, network applications, network protocols, customers, geographic regions, and/or communities, such as, but not limited to cities, counties or countries.

FIGS. 3-7 illustrate exemplary reports that may be generated in accordance with various embodiments. In these embodiments the reports comprise tables; however, the tables are merely one example of the manner of presentation. In addition to tabular form, traffic flow data can be presented, for example, by charts (e.g., pie charts, bar charts), graphs (e.g., trend line graphs), text, spreadsheets, and histograms. Such reports can be presented on a computer display, and/or printed on paper, or other output mechanism. The reports also may be stored in files and/or sent via email to one or more users.

FIG. 3a illustrates an exemplary peer outbound distribution report 300. The peer outbound distribution report 300 indicates the traffic volume sent to one or more other peer autonomous systems by a selected peer AS, referred to here as Peer AS 'n'. The left column 302 of the report 300 lists names or other identifiers of peer autonomous systems and the right column 304 lists the corresponding traffic volume sent to the associated peer AS networks identified in the left column. The volume may be listed in various units, such as Megabits, Gigabits, or as a percentage of total volume sent by Peer AS 'n'.

FIG. 3b illustrates an exemplary peer inbound distribution report 306. The peer inbound distribution report 300 indicates the traffic volume sent to Peer AS 'n' from one or more other peer autonomous systems. The left column 308 of the report 306 lists names or other identifiers of peer autonomous systems and the right column 310 lists the corresponding traffic volume sent from each of the peer AS's identified in the left column to the Peer AS 'n'. The volume may be listed in various units, such as Megabits, Gigabits, or as a percentage of total volume received by Peer AS 'n'.

FIG. 4a illustrates an exemplary on-net/off-net outbound distribution report 400. In general the report 400 indicates the traffic volume sent by AS 'n' that is also received by AS 'n' (on-net) and the traffic volume sent by AS 'n' that is not received by AS 'n' (off-net). For example, in the case of on-net traffic, the traffic is sent from a node (e.g., an endpoint) on the AS 'n' network onto the backbone network, and is directed to a destination node that is also on the AS 'n' network, so the backbone network routes the traffic back onto the AS 'n' network. By contrast, off-net traffic is sent from the AS 'n' network and has a destination on a different AS network, so the backbone network routes the traffic onto the different AS network. Referring to report 400, the left column 402 includes designations on-net and off-net. The right column 404 indicates the volume of traffic sent from the AS 'n' network that is on-net and off-net, respectively. The volumes in the right column 404 can be in various units such as Megabits, Gigabits, or as a percentage of total outbound volume.

FIG. 4b illustrates an exemplary on-net/off-net inbound distribution report 406. In general the report 406 indicates the traffic volume received by AS 'n' that is also sent by AS 'n' (on-net) and the traffic volume received by AS 'n' that is not sent by AS 'n' (off-net). The report 406 includes a left column 408 that includes designations on-net and off-net. The right column 410 indicates the volume of traffic received by the AS 'n' network that is on-net and off-net respectively. The volumes in the right column 410 can be in various units such as Megabits (Mb), Gigabits (Gb), or as a percentage of total inbound volume.

FIG. 5a illustrates an exemplary customer outbound distribution report 500. In general, the report 500 indicates traffic volume that is sent by an AS (AS 'n' in this example) to selected customers of the NSP network that carries the traffic. The report 500 includes a left column 502 that lists customer identifiers (e.g., customer names). The right column 504 indicates the traffic volume sent by AS 'n' to the respective customers identified in the left column 502. In the particular example of FIG. 5, the top 10 customers are shown; however, any customers could be selected for the report 500.

FIG. 5b illustrates an exemplary customer inbound distribution report 506. In general, the report 506 indicates traffic volume that is received by an AS (AS 'n' in this example) from selected customers of the NSP network that carries the traffic. The report 506 includes a left column 508 that lists customer identifiers (e.g., customer names). The right column 510 indicates the traffic volume received by AS 'n' from the respective customers identified in the left column 508. In the particular example of FIG. 5, the top 10 customers are shown; however, any customers could be selected for the report 506.

FIG. 6a illustrates a report 600 of the AS's associated with the highest traffic volume on an NSP network. A left column 602 lists AS's by name (or other identifier). An 'average volume' column 604 lists the average volume sent or received by the respective AS shown in the left column 602. A 'top region' column 606 lists the region identifier and associated volume for the region that the associated AS sends to or receives from. Exemplary regions are Europe, North America or Asia. The volume shown in column 606 could be a percentage of total volume or some other units, such as Mb or Gb. An 'on-net/off-net' column 608 indicates whether most of the volume was on the respective AS's network or off the respective AS's network, and what the percentage of volume the on-net or off-net volume constituted.

In a 'direction' column 610 indicates the direction of the majority of traffic flow relative to the respective AS listed in the left column 602. The direction is indicated by the terms 'source' (sent from the AS) and 'sink' (received by the AS). A 'next hop AS's' column 612 identifies one or more AS's that the traffic flow was sent to in the routing of the traffic. An 'upstream' AS's column 614 identifies one or more AS's that the traffic was routed through prior to getting to the respective AS listed in the left column 602. The next hop AS's and upstream AS's can be determined from the routing table provided by the router or switch. The AS's can be identified by any relevant identifiers, such as, but not limited to, a name or number.

FIG. 6b illustrates an exemplary report 616 of the applications or protocols associated with the highest traffic volume on an NSP network. Exemplary applications or protocols include, but are not limited to, Internet Protocol Version 4 (or other version), Internet control message protocol (ICMP), Internet group multicast protocol (IGMP), gateway to gateway protocol, transmission control protocol (TCP), interior gateway protocol (IGP), exterior gateway protocol (EGP), universal datagram protocol (UDP), source demand routing protocol (SDMP), simple mail transport protocol (SMTP), EIGRP, TCF, and multicast transport protocol (MTP). The left column 618 lists application or protocol identifiers, such as names, acronyms, version numbers, or others.

An 'average volume' column 620 indicates the average traffic volume associated with the respective application/protocol listed in the left column 618. Columns 622, 624, 626 and 628 list average region to region volumes for selected regions. Specifically an 'Average EU to EU Volume' column 622 lists the average traffic volume associated with the respective application/protocol that was sent from Europe and received in Europe. An 'Average EU to NA Volume' column 624 lists the average traffic volume associated with the respective application/protocol that was sent from Europe and received in North America. An 'Average NA to EU Volume' column 626 lists the average traffic volume associated with the respective application/protocol that was sent from North America and received in Europe. An 'Average NA to NA Volume' column 628 lists the average traffic volume associated with the respective application/protocol that was sent from North America and received in North America.

FIG. 7a illustrates an exemplary report 700 of the trends in volume of traffic associated with selected applications or protocols. The left column 702 lists application or protocol identifiers, such as names, acronyms, version numbers, or others. Columns 704, 706, 708, and 710 provide trend data for the applications/protocols listed in the left column 702. For example, an 'Average Trended (Mb/s)' column 704 lists the 1 year trend in average traffic flow in Mb/s for the respective applications/protocol. An 'Average CAGR (Mb/s)' column 706 lists the compound average growth rate in Mb/s for the respective applications/protocol. An 'Average Trended (%)' column 708 lists the 1 year trend in average traffic flow as a percentage for the respective applications/protocol. An 'Average CAGR (%)' column 706 lists the compound average growth rate as a percentage for the respective applications/protocol.

FIG. 7b illustrates an exemplary city to city traffic flow report 712. Other reports could show traffic flow from and to other geographic areas such as countries, continents, or regions. In the left column 714, the date(s) of the measurement or report are listed. A 'Source City' column 716 lists one or more source cities from which traffic was sent. A 'Destination City' column 718 lists destination cities that the traffic was sent to from the respective source cities in the 'Source City' column 716. Cities may be identified by name, abbreviation or other identifier. An 'Average Volume' column 720 indicates the traffic volume sent to the respective destination city by the source city. In this embodiment, the volume is indicated in units of Mb/s, but other units could be used depending on the particular implementation.

The various reports described above and variations of those reports can be used for marketing analysis, capacity planning, security analysis, and others. For example, a city-to-city traffic flow report (or other geographic regional flow report) can be used to determine if traffic flow is overloading a gateway at a particular city, or if extra bandwidth is available in the gateway. The peer-to-peer distribution reports or peer-to-customer distribution reports can suggest new services to provide or whether to increase bandwidth or price for given customers or peers. A report that shows the next hop autonomous systems and upstream autonomous systems can indicate how far traffic is traveling to reach its destination; if traffic is traveling very far (from a topological, logical, or geographical basis) this could suggest the need for additional bandwidth at different geographic or network locations.

Exemplary Operations

Figure 8:
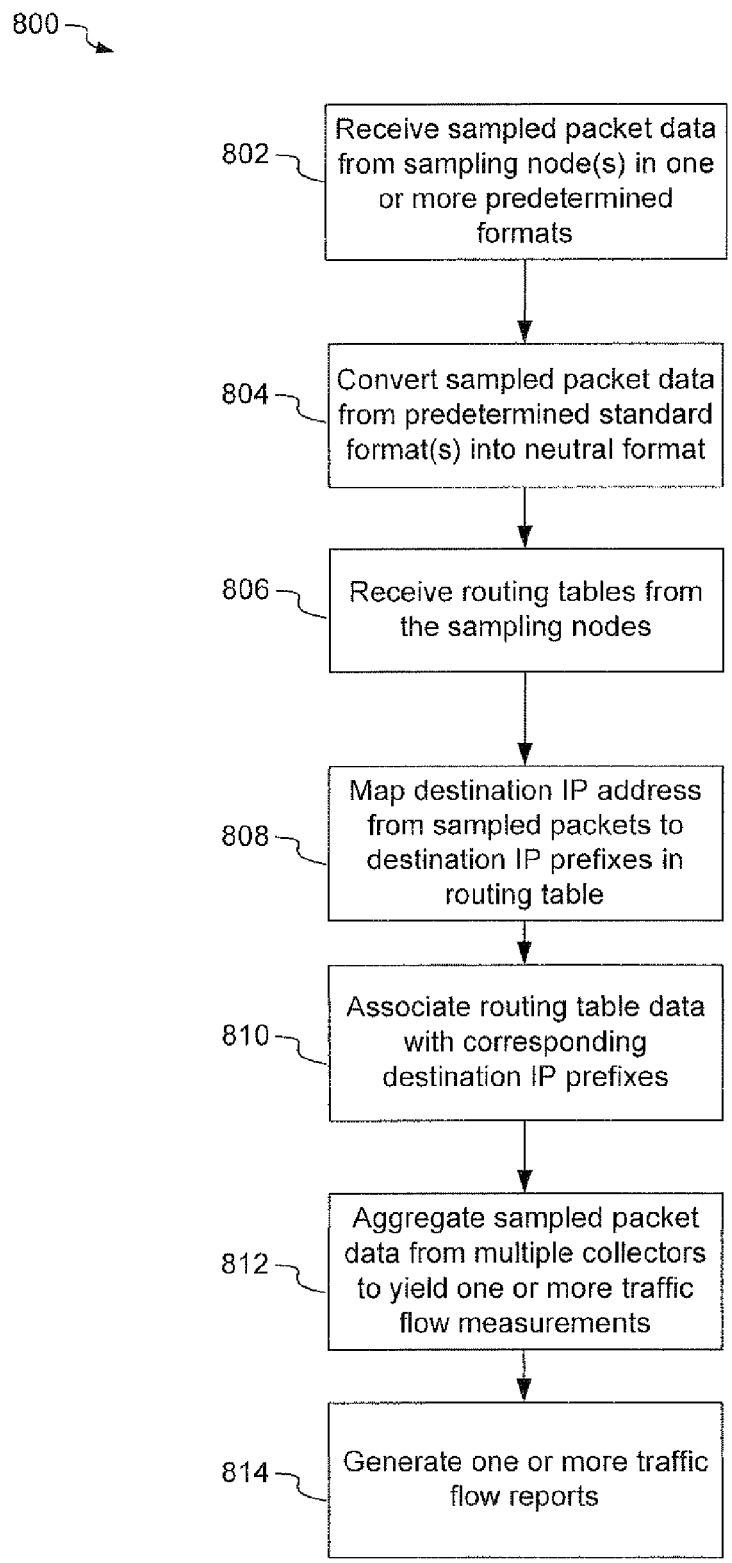
FIG. 8 is a flowchart illustrating a traffic flow aggregating and reporting algorithm in accordance with an embodiment of the present invention.

FIG. 8 is a flowchart illustrating a traffic flow aggregating, mapping and reporting algorithm 800 in accordance with one embodiment. The algorithm 800 may be carried out by one or more collector nodes and aggregator nodes discussed above or alternatively on one or more other systems. The operations shown in the algorithm 800 need not be carried out in the particular order shown except where order is implied. The particular operations and steps included in the operations may be rearranged, broken out, or combined with others as may be suitable to a particular implementation without straying from the scope of the invention.

In a receiving operation 802, sampled packet data is received. In one embodiment the sampled packet data includes data from sampled packets, wherein the data is formatted according to a predetermined standard format. Exemplary formats include, but are not limited to, sFlow format, Netflow format, and cflowd format. The sampled packet data may include, but is not limited to, source IP address, destination IP address, port number(s), AS identifier, network application or network protocol.

In a converting operation 804, the sampled packet data is converted to a neutral format. In one embodiment, the converting operation 804 involves identifying specified data in the sampled packet data, such as source IP address, destination IP address, port number(s), or AS number, and storing the specified data in fields of a data structure organized in accordance with the neutral format. The converting operation 804 may convert that data to other units or encoding prior to storing the data in the data structure.

In another receiving operation 806, one or more routing tables are received from a network node. The routing table(s) set forth a list of routes to specified destination IP addresses. The routing table(s) may also include community data, such as city, country, continent or region associated with the destination IP addresses. The routing table(s) may further indicate AS numbers and/or routers associated with the destination IP addresses. Further still, the routing table(s) could indicate whether each of the destination IP addresses are associated with a customer of the NSP or not.

In mapping operation 808, destination IP addresses from each of the sampled packet data are mapped to destination prefixes in the routing tables. In an associating operation 810, the community data, AS data, and router data in the routing table(s) are associated with the corresponding destination addresses.

In an aggregating operation 812, sample packet data and related routing table data are aggregated from multiple network interconnection points. In one embodiment, AS numbers in the sample packet data are mapped to AS names found in an AS registry In some embodiments, customer attributes are mapped to corresponding sample packet data to further enrich the data. The aggregating operation 812 derives one or more traffic flow measurements corresponding to one or more traffic flows through the NSP network. For example, a total flow measurement may indicate total traffic flow between one or more peer networks or one or more AS networks. In addition, traffic flows between geographic regions can be determined. Further still, on-net and off-net traffic flow measurements may be determined for one or more peer or AS networks. As yet another example, traffic flows between peers and NSP customers and noncustomers can be derived in the aggregating operation 812. Numerous other traffic flow measurements may be derived in the aggregating operation 812.

In a generating operation 814, one or more reports are generated that show the traffic flow measurements, trends or other traffic flow statistics associated with traffic flow. Exemplary reports that the generating operation 814 could generate are shown in FIGS. 3-7 and described above; however, the types, format, and contents of reports are not limited to those shown above. In some embodiments, reports are generated automatically, on demand or both. The generating operation 814 may also send the reports to specified individuals, such as network administrators or managers, for analysis.

Exemplary Computing Device

Figure 9:
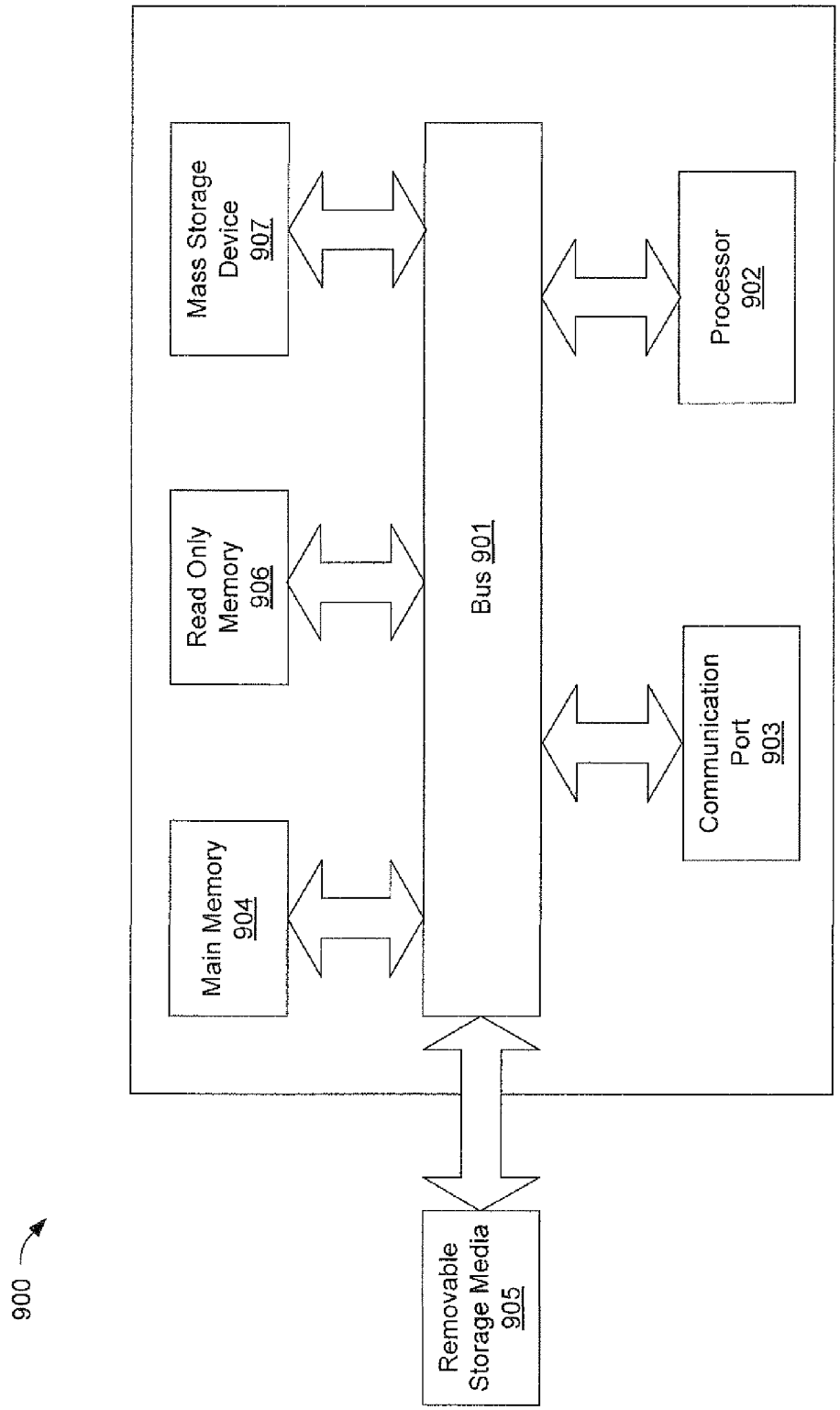
FIG. 9 illustrates a general purpose computing device upon which one or more aspects of embodiments of the present invention may be implemented.

FIG. 9 is a schematic diagram of a computing device 900 upon which embodiments of the present invention may be implemented and carried out. For example, one or more computing devices 900 may be used to perform the sampling, collecting, aggregating, and reporting operations described herein. As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

According to the present example, the computing device 900 includes a bus 901, at least one processor 902, at least one communication port 903, a main memory 904, a removable storage media 905, a read only memory 906, and a mass storage 907. Processor(s) 902 can be any known processor, such as, but not limited to, an Intel® Itanium® or Itanium 2® processor(s), AMD® Opteron® or Athlon MP® processor (s), or Motorola® lines of processors. Communication port(s) 903 can be any of an RS-232 port for use with a modem based dialup connection, a 10/100 Ethernet port, a Gigabit port using copper or fiber, or a USB port. Communication port(s) 903 may be chosen depending on a network such a Local Area Network (LAN), Wide Area Network (WAN), or any network to which the computing device 900 connects. The computing device 900 may be in communication with peripheral devices (not shown) such as, but not limited to, printers, speakers, cameras, microphones, or scanners.

Main memory 904 can be Random Access Memory (RAM), or any other dynamic storage device(s) commonly known in the art. Read only memory 906 can be any static storage device(s) such as Programmable Read Only Memory (PROM) chips for storing static information such as instructions for processor 902. Mass storage 907 can be used to store information and instructions. For example, hard disks such as the Adaptec® family of SCSI drives, an optical disc, an array of disks such as RAID, such as the Adaptec family of RAID drives, or any other mass storage devices may be used.

Bus 901 communicatively couples processor(s) 902 with the other memory, storage and communication blocks. Bus 901 can be a PCI/PCI-X, SCSI, or USB based system bus (or other) depending on the storage devices used. Removable storage media 905 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Embodiments of the present invention include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A method for analyzing traffic in a communications network, the method comprising:
    sampling packet data at a plurality of network interconnection points, wherein the communications network is communicatively coupled to a plurality of autonomous systems by the plurality of network interconnection points;
    enriching the sampled packet data, wherein enriching the sampled packet data comprises:
    mapping IP addresses of the sampled packet data to corresponding IP prefixes associated with the plurality of autonomous systems;

mapping the IP addresses of the sampled packet data to customers; and generating one or more sampled packet data summaries at a collector node by mapping the sampled packet data to routing table data from communication nodes associated with the collector node;

aggregating the enriched sampled packet data to yield aggregated traffic flow measures associated with one or more customers; and generating one or more traffic flow reports based on the sampled packet data, wherein the one or more reports are selected from a group consisting of:

a peer distribution report comprising one or more of traffic volume measurements of traffic outbound from a peer network or traffic volume measurements of traffic inbound to the peer network;

a customer distribution report comprising one or more of traffic volume measurements of traffic outbound from one or more customer networks or traffic volume measurements of traffic inbound to the one or more of customer networks;

an autonomous system distribution report comprising one or more of average traffic volume, traffic volume by region, on-net traffic volume, off-net traffic volume, direction of traffic, next hop autonomous systems, and upstream autonomous systems associated with one or more autonomous systems;

an applications report comprising average traffic volume and region to region traffic volume associated with network applications;

an on-net distribution report comprising traffic volume measurements of traffic outbound from a peer network that was also inbound to the peer network;

an off-net distribution report comprising traffic volume measurements of traffic outbound from a peer network that was not also inbound to the peer network;

a region distribution report comprising average traffic volume inbound to or outbound from selected regions; and a city distribution report comprising average traffic volume from one or more source cities to one or more destination cities.

2. The method of claim 1, wherein the IP prefixes are obtained from a routing table.

3. The method as recited in claim 1 further comprising converting the sampled packet data from one or more standardized formats into a neutral format.

4. The method as recited in claim 1, wherein enriching the sampled packet data comprises mapping the IP addresses of the sampled packet data to geographic locations, the method further comprising:

aggregating the enriched sampled packet data to yield aggregated traffic flow measures associated with one or more geographic locations.

5. The method as recited in claim 3, wherein the one or more standardized formats comprise sFlow format, Netflow format and cflowd format.

6. The method as recited in claim 4, wherein the one or more geographic locations comprise one or more of a city, a country, a continent or a region.

7. The method as recited in claim 1, further comprising communicating the one or more sampled packet data summaries from the collector node to an aggregator node configured to perform the aggregating.

8. A system for analyzing traffic flow in a communications network, the system comprising:

a communications node comprising a sampling agent operable to sample packet data flowing through the communications node and generate sample packet data;

a collector node operable to enrich the sampled packet data by mapping IP addresses of the sampled packet data to IP prefixes in a routing table of the communications node, wherein the IP prefixes are associated with respective autonomous systems, and wherein the collector node is further operable to map the sampled packet data to associated autonomous systems; and an aggregator node operable to aggregate the enriched sampled packet data to yield aggregated traffic flow measures associated with one or more autonomous systems, wherein the aggregator node is further operable to generate one or more traffic flow reports based on the sampled packet data, wherein the one or more reports are selected from a group consisting of:

a peer distribution report comprising one or more of traffic volume measurements of traffic outbound from a peer network or traffic volume measurements of traffic inbound to the peer network;

a customer distribution report comprising one or more of traffic volume measurements of traffic outbound from one or more customer networks or traffic volume measurements of traffic inbound to the one or more of customer networks;

an autonomous system distribution report comprising one or more of average traffic volume, traffic volume by region, on-net traffic volume, off-net traffic volume, direction of traffic, next hop autonomous systems, and upstream autonomous systems associated with the one or more autonomous systems;

an application report comprising average traffic volume and region to region traffic volume associated with network applications;

an on-net distribution report comprising traffic volume measurements of traffic outbound from a peer network that was also inbound to the peer network;

an off-net distribution report comprising traffic volume measurements of traffic outbound from a peer network that was not also inbound to the peer network;

a region distribution report comprising average traffic volume inbound to or outbound from selected regions; and a city distribution report comprising average traffic volume from one or more source cities to one or more destination cities.

9. The system of claim 8, further comprising an autonomous system registry storing information about the one or more autonomous systems comprising autonomous system identifiers and regions.

10. The system of claim 8, further comprising a customer attributes data store storing customer autonomous system identifiers.

11. The system of claim 9, wherein the aggregator node is further operable to map autonomous system identifiers from the sampled packet data to the regions in the autonomous system registry.

12. The system of claim 8, wherein the aggregator node is further operable to generate traffic flow measurements associated with network applications based on the sampled packet data that was converted from a standardized format into a neutral format.

13. The system of claim 8, wherein the aggregator node is further operable to generate the one or more reports relating traffic flow measurements to one or more of a region, an autonomous system, a community, a network application, or a network protocol.

14. The system of claim 12, wherein at least one of the one or more reports comprises traffic flow measurements for traffic flowing from a selected community to at least one other community.

15. The system of claim 8, wherein the aggregator node is further operable to generate a traffic flow measurement of outbound traffic from a selected autonomous system to each of a plurality of other autonomous systems.

16. The system of claim 8, wherein the aggregator node is further operable to generate a traffic flow measurement of outbound traffic to a selected autonomous system from each of a plurality of other autonomous systems.

17. The system of claim 8, wherein the aggregator node is further operable to generate a traffic flow measurement of on-net traffic and a traffic flow measurement of off-net traffic for a selected autonomous system.

18. A method for analyzing communications traffic through a network, the method comprising:
sampling data packets communicated through the network;
enriching the sampled data packets by categorizing each of the sampled data packets according to one or more network-related attribute categories, wherein the one or more network related attribute categories comprises routing table data;
aggregating the sampled data packets of each of the attribute categories;
determining the sampled data packet transmission statistics associated with each of the one or more attribute categories based on the aggregation; and
generating one or more traffic flow reports based on the sampled packets, wherein the one or more reports are selected from a group consisting of:
a peer distribution report comprising one or more of traffic volume measurements of traffic outbound from a peer network or traffic volume measurements of traffic inbound to the peer network;
a customer distribution report comprising one or more of traffic volume measurements of traffic outbound from one or more customer networks or traffic volume measurements of traffic inbound to the one or more of customer networks;
an autonomous system distribution report comprising one or more of average traffic volume, traffic volume by region, on-net traffic volume, off-net traffic volume, direction of traffic, next hop autonomous systems, and upstream autonomous systems associated with one or more autonomous systems;
an applications report comprising average traffic volume and region to region traffic volume associated with network applications;
an on-net distribution report comprising traffic volume measurements of traffic outbound from a peer network that was also inbound to the peer network;
an off-net distribution report comprising traffic volume measurements of traffic outbound from a peer network that was not also inbound to the peer network;
a region distribution report comprising average traffic volume inbound to or outbound from selected regions; and
a city distribution report comprising average traffic volume from one or more source cities to one or more destination cities.

19. The method of claim 18 wherein the one or more attribute categories comprise one or more of geographic region, network, community, application, protocol, autonomous system, customer, on-net, or off-net.

20. The method of claim 19 wherein determining the sampled data packet transmission statistics comprises determining data packet volume transmitted to or from one or more of a geographic region, a network, a community, an autonomous system, a customer, an on-net provider, or an off-net provider.

* * * * *